Sept. 28, 1965  R. H. APPELDORN  3,208,337
STAND FOR AN OVERHEAD PROJECTOR
Filed April 15, 1963
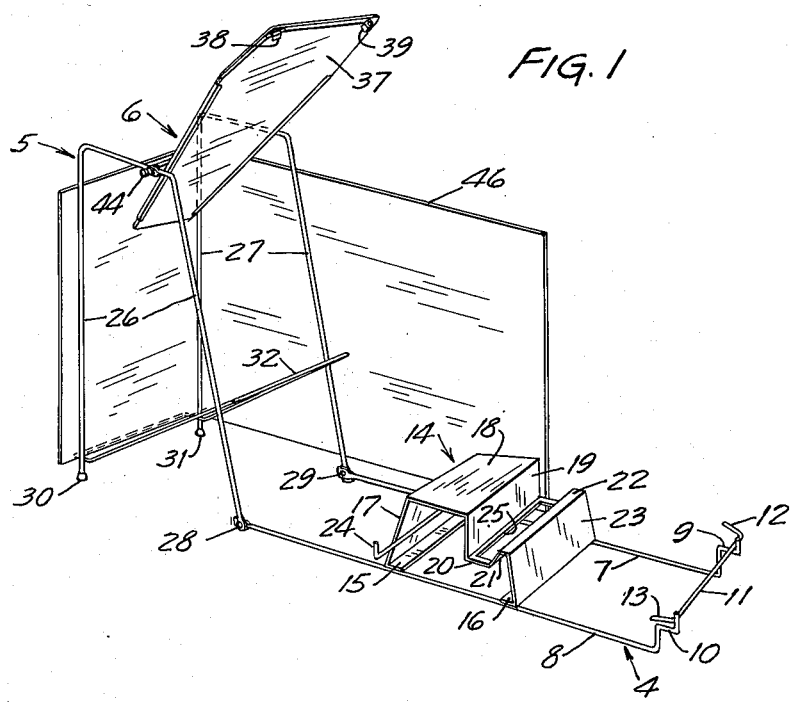
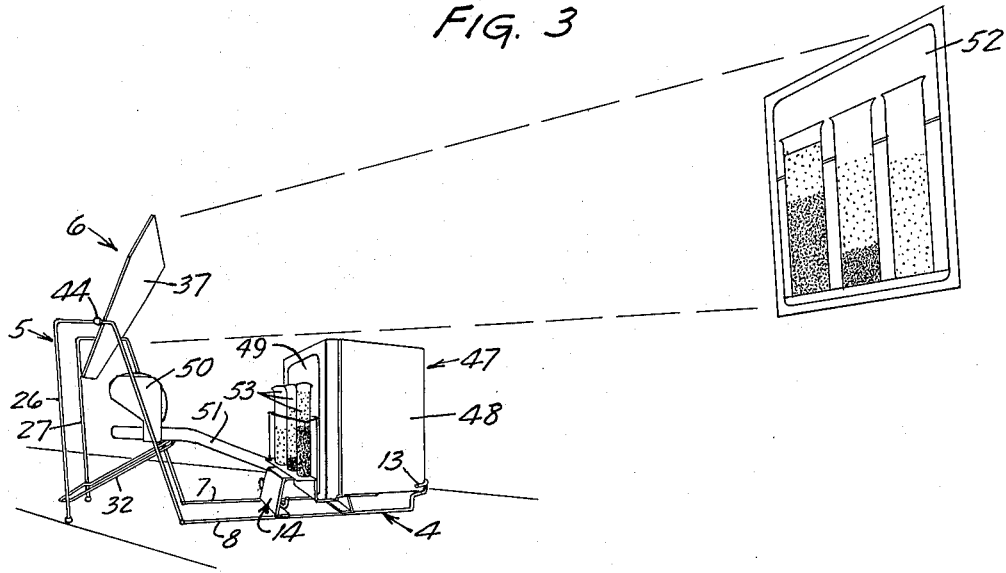
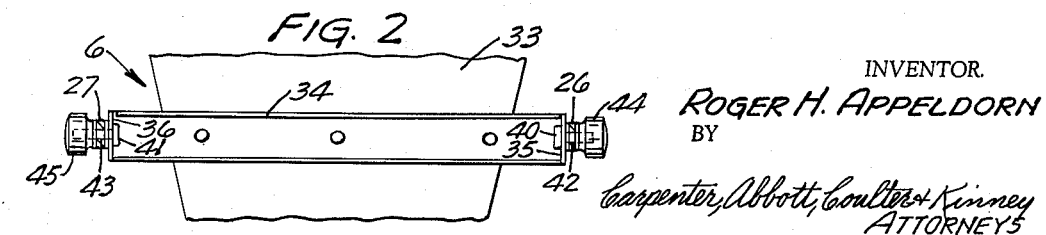
INVENTOR.
ROGER H. APPELDORN
BY
Carpenter, Abbott, Coulter & Kinney
ATTORNEYS

United States Patent Office 3,208,337
Patented Sept. 28, 1965

3,208,337
STAND FOR AN OVERHEAD PROJECTOR
Roger H. Appledorn, White Bear Lake, Minn., assignor to Minnesota Mining and Manufacturing Company, St. Paul, Minn., a corporation of Delaware
Filed Apr. 15, 1963, Ser. No. 273,158
5 Claims. (Cl. 88—24)

This invention relates to projection equipment and in particular to an accessory apparatus adapted for use with an overhead projector to extend the usefulness thereof.

Visual aids in education, business and other fields where material is presented to an audience, have become increasingly popular. With this increased use of visual aids the use of overhead projectors during oral presentations has become more commonplace. The overhead projector with a horizontally disposed stage upon which transparencies are generally placed meets most of the requirements necessary during such presentations. However, in education where it is necessary at times to display physical objects to an audience, rather than graphic illustrations on transparencies, the horizontal stage often is inadequate. One example of such physical objects generally desirable to display to a viewing audience is a test tube or other vessel from the science laboratory containing fluid, which must necessarily be positioned vertically in order to maintain the fluid in said vessel and at the same time disclose its contents to the viewing audience. This cannot be accomplished when the projection stage is horizontally disposed and the light path from the stage is directed vertically, therefore it has previously been necessary to have a similar expensive projector for this purpose.

The apparatus of the present invention provides means for receiving and supporting an overhead projector on its side such that the normally horizontal stage is positioned vertically and the path of the light through the stage is horizontal. The apparatus is formed with a work-receiving surface disposed adjacent the stage in its vertically oriented position to provide a surface upon which articles, which must necessarily be vertically positioned, may be placed for projecting a light image of said articles on a remote screen. Reflecting means supported on the apparatus add necessarily to said apparatus an element to intercept and direct the light image projected from the projection head of the projector toward the screen.

These and other advantages are provided by means of the novel adapter or accessory apparatus as herein described, and of which a preferred form is illustrated in the accompanying drawing. In the drawing:

FIGURE 1 is a perspective view of the preferred embodiment of the apparatus,

FIGURE 2 is a fragmentary end view of one portion of the apparatus as illustrated in FIGURE 1, and FIGURE 3 is a schematic view illustrating the apparatus as it is used with an overhead projector.

Referring now to the drawing and particularly FIGURE 1, the stand consists generally of a frame, reflecting means and may include a separable light shield. The frame comprises three portions or separate frames, which include a first generally horizontally disposed frame portion 4, a second upright frame portion 5 and a third frame 6 supported on the upper portion of said second frame portion 5.

The frame 4 comprises a pair of elongate symmetrical, transversely spaced rods 7 and 8 which are preferably formed of steel rods having a diameter of about ¼ inch. Each of the rods 7 and 8 are formed adjacent one end with offset parallel longitudinally extending surface portions 9 and 10, respectively, upon which one edge of a generally rectangular box-like member may rest and be supported thereon. The above described ends of the rods 7 and 8 terminate in vertically extending portions which serve to prevent longitudinal movement of a box-like member when positioned on the portions 9 and 10 thereof. A transversely extending cross-bar 11, formed with bent longitudinally extending end portions 12 and 13 as shown in FIGURE 1, is fixed to the vertically extending end portions of the rods 7 and 8. The rod 11 serves to maintain rods 7 and 8 in transversely spaced relation and the end portions 12 and 13 thereof serve to prevent lateral movement of the box-like member when supported on the horizontal portions 9 and 10. The opposite ends of the rods 7 and 8 are formed with aligned openings to receive therein suitable pins 28 and 29, which may take the form of rivets, bolts or the like, for connecting the second upright frame 5 to the frame 4. The frame 4 further includes a generally centrally disposed supporting structure, generally designated, 14.

The supporting structure 14 is formed of sheet metal and is fixed to the upper surface of the rods 7 and 8 by securing horizontal flange or base portions 15 and 16 thereof to the upper side of said rods by suitable means such as weldments. Extending upwardly from the flange 15 is a vertically disposed wall 17, as shown in FIGURE 1, to which is joined a relatively narrow, horizontal, transversely extending, flat work-receiving surface or table portion 18, a second vertical wall 19, a generally flat supporting plate 20, a third vertical wall 21, a flange 22, and a fourth vertical wall 23 joined to the flange 16. The vertical wall 17 has secured thereto a horizontal transversely extending rod member 24 having upwardly extending terminal end portions. The plate 20 is formed with a large slotted opening 25 for reasons to be hereinafter explained.

The second frame 5 comprises a pair of generally inverted U-shaped, transversely spaced, frame members 26 and 27, formed of steel rods similar to those of the frame 4. One end of each of the rods 26 and 27 is formed with openings which receive therein the fastening means 28 and 29 used for securing the frame 5 to the frame 4. The other ends of the rods 26 and 27 have suitable rubber caps 30 and 31 fitted thereon to prevent said ends from scratching or marring a surface upon which the stand may be placed. Secured between the transversely spaced rods 26 and 27 and completing the frame 5 is a generally rectangularly shaped frame 32 formed of round rod stock. The frame 32 is positioned angularly with respect to the end portions of the rods 26 and 27. As illustrated in FIGURE 1, the lower transversely extending side of the frame 32 is spaced longitudinally from the rods 26 and 27 to form a shelf-like supporting surface for one section of a shield 46, to be hereinafter described, and the upper transversely extending side of the frame 32 is positioned at a height to support a part of the projector as shown in FIGURE 3.

Mounted on the upper portion of the frame 5 between the longitudinal extending portions of the rods 26 and 27 is the third frame 6. As illustrated in FIGURES 1 and 2 the frame 6 comprises a first generally flat truncated triangularly shaped plate member 33 and a transversely extending channel-shaped bar 34. The bar 34 is formed with bent end portions 35 and 36, bent to extend in the direction of the flanges of the channel. The bar 34 is secured to the plate 33 and extends transversely thereof offset from the central transverse axis of said plate member 33. The plate 33 has the lower converging side portions thereof, as illustrated in FIGURE 1, bent to form channels on the side of the plate 33 opposite the bar 34 to slidably receive therebetween a reflector or mirror 37. The converging configuration of the channels formed on the sides of the plate 33 support the mirror 37 together with suitable clips 38 and 39 positioned adjacent the upper corners of said mirror, to prevent displacement of the mirror from the bent and formed converging channels.

The bent end portions 35 and 36 of the bar 34 are formed with aligned openings through which extend screws 40 and 41. The extended ends of the screws 40 and 41 are journalled in suitable openings 42 and 43 formed in the longitudinal portions of the rods 26 and 27 of the frame 5. Suitable washers are positioned on the screws 40 and 41 between the end members 35 and 36 and the rods 26 and 27 respectively. Knobs 44 and 45 are threadably received on the ends of the screws 40 and 41 to frictionally bind other washers fitted thereon between said knobs and the rods 26 and 27 in a manner to provide an adjustable frictional fastening for the frame 6 on the upper portion of the frame 5. The fastening permits the mirror 37 to be positioned and held in any desired inclined position.

The shield 46 is formed of two sections hinged together by suitable means joined along one side of each of the sections to form a foldable L-shaped member in plan view. One section of the shield 46 is adapted to be supported on the frame 32 with the other section positioned along either longitudinal side of the frames 4 and 5. The rod member 24 is adapted to support one end of the longitudinally disposed section and spring clips or brackets may also be secured to the shield to clamp onto the frames for holding said shield in place. The shield 46 as it surrounds one end portion and side of the stand prevents horizontally projected light from shining in the eyes of the viewing audience when the stand is used with a projector as will be described below.

FIGURE 3 of the drawing illustrates the use of the stand with a normally upright-oriented overhead projector 47. The projector 47 comprises a box-like case 48 in which is located a suitable light source (not shown) and a condensing lens system for collecting light from said source and directing the same in a cone outwardly through a light transmitting plate or stage 49, which closes the upper side of the box-like case 48. A projection head 50 is positioned in aligned spaced relation with respect to the stage 49. The projection head 50 is mounted by suitable means on a supporting bracket 51 for movement toward and away from the stage 49, to permit focusing of a projected light image on a remote screen, such as the screen 52 illustrated in FIGURE 3. When the projector 47 is positioned on its side, as shown, a cone of light is directed generally horizontally through the stage 49 toward the projection head 50 from which it is directed vertically upward to be reflected off of the mirror 37 onto the screen 52. The lower side of the box-like case 48 is supported on the horizontal portions 9 and 10 of the rods 7 and 8 and on the supporting plate 20 and flange 22 of the structure 14. The opening 25 in the plate 20 allows air to be drawn through the box-like case by an air circulating fan (not shown) enclosed therein.

When an overhead projector, such as the projector 47 is positioned in the stand as shown, articles may be placed upon the relatively narrow work-receiving surface 18 and an image thereof may be projected onto a remote screen. As illustrated in FIGURE 3, three test tubes or similar vessels 53 are positioned in a suitable rack on the surface 18 close to the vertically disposed stage 49. When light is directed through the stage 49 and through the projection head 50, and is reflected from the mirror 37, a light image of the test tubes and contents thereof is formed on the screen where it can easily be seen by the viewing audience.

This system allows titrations, manipulations, electrolysis and meter readings to be readily projected onto a large screen in the front of a fully lighted classroom. With this system transparent materials appear in full color, opaque materials appear as silhouettes upon the screen. It may be preferable to use flat walled vessels or test tubes as the normally curved surfaces of such articles tend to cause reflection and reduce the transparent area projected.

When the shield 46 is removed the connection of the frame 4 and frame 5 by the pins 28 and 29 extending through the ends of the rods 26, 27, 8 and 7 respectively, permits the frame member 4 to be pivoted upwardly from the position shown in FIGURE 1 to a vertical standing position adjacent the frame 5. This reduces the overall length of the stand considerably to facilitate storage of the same.

The frame 4 and the frame 5 may have all portions thereof coated with a suitable cushioning protective coating such as polyvinylchloride. This coating gives the rod-like members and the supporting structure 14 a smooth, pleasant appearance and prevents the same from scratching or marring the overhead projector as it is placed on and removed from the stand. The coating may be applied to the stand by either dipping the frame in or spraying the frame with the coating material.

It should be understood that certain changes may be made in the construction and arrangement of the several parts employed in the preferred embodiment without departing from the spirit of the invention, so long as such changes fall within the scope of the appended claims.

Having described the invention, what is claimed is:

1. A stand adapted for supporting a normally upright overhead projector as described herein on its side to utilize the same for projecting a side view of necessarily vertically positioned articles onto a screen, said projector having a box-like case the upper side of which is closed by a transparent stage upon which transparencies are normally placed to have a light image thereof projected on a vertical screen, a suitable light source within said case from which light is directed outwardly through said stage in a cone of light for projecting said light image upwardly, and a projection head supported in spaced aligned relation with said stage to intercept said cone of light to change direction of and project said light image toward said screen, said stand comprising: a first normally horizontally disposed frame portion including supporting means adapted to receive one side of a said box-like case to position the stage of a said projector in a vertical position, and a narrow work-receiving surface disposed close to said supporting means affording a surface across which light from a said projector will be directed and upon which articles may be placed; a second upright frame portion joined to one end of said first frame portion; and reflecting means supported in inclined relation on the uppermost portion of said second frame portion in a position to be above a said projection head for directing a said light image of the placed articles toward a said remote screen.

2. A stand adapted for supporting a normally upright overhead projector as described herein on its side to utilize the same for projecting a side view of necessarily vertically positioned articles onto a remote screen, said projector having a box-like case, a light source positioned within said case, means for gathering light from said source and directing the same outwardly of said case through a light transmitting stage, and a projection head supported in spaced aligned relation with said stage, said projector being suitable for projecting on a vertical screen a light image of a transparency placed on said stage, said stand comprising: a first normally horizontally disposed elongated frame including supporting means adapted to receive one side of a said box-like case to position the normally horizontal stage of a said projector in a vertically disposed position and a narrow work-receiving surface disposed close to said supporting means to afford a surface upon which articles may be placed and across which light from a said projector will be directed; a second upright frame joined to one end of said first frame, reflecting means tiltably supported for movement to any desired inclined position and mounted on the uppermost portion of said second frame in a position to be above a said projection head for directing a said light image of the articles toward a said remote screen; and shield means supported by said frames adjacent one end and one side of the stand for blocking light directed from a said vertically positioned stage from traveling beyond said end and side of the stand.

3. A stand for supporting a normally upright oriented projector on its side to utilize the same for projecting a side view of necessarily vertically positioned objects, such as open vessels containing fluid, onto a screen, said stand comprising: a first elongated frame including a pair of transversely spaced elongated bars formed at one end with horizontally disposed portions adapted to receive and support one edge of a generally rectangular box-like member and having hinge means at their other ends, said frame further including a generally centrally positioned transversely disposed member which is secured to and joins the upper surface of said bars, said transverse member including a flat work-receiving surface disposed above and closely adjacent a horizontal plate portion adapted to receive and support another edge of a said box-like member in parallel relation to said one edge thereof; a second upright frame connected to the hinge means of said first frame and having a reflector supporting third frame mounted transversely across the upper portion of said second frame, and journal means for said reflector supporting frame affording adjustment thereof to place a reflector supported thereby at any desired angle.

4. A stand for supporting a normally upright oriented projector, as described in the specification, on its side to utilize the same for projecting a side view of necessarily vertically positioned objects such as open vessels containing fluid onto a screen comprising: a first elongated frame including a pair of transversely spaced elongated rods formed at one end with horizontally disposed portions adapted to receive and support one edge of a generally rectangular box-like case and having hinge means at their other ends, said frame further including a transversely disposed frame structure which is secured to said bars generally centrally thereof and which has a flat work-receiving surface disposed closely adjacent a horizontal flange portion adapted to receive and support a second edge of a said box-like case; a second upright frame formed of inverted, U-shaped, transversely spaced rods pivotally connected to the hinge means of said first frame, a mirror, a mirror supporting third frame mounted transversely across the upper portion of said second frame, and journal means for said mirror supporting frame affording adjustment thereof to place said mirror in any desired position; and a shield formed of two hinged sections, one of said sections being positioned and supported on one side of said first and second frames and the other section being positioned along one end of said second frame and supported thereby.

5. A stand adapted for supporting a normally upright overhead projector as described herein on its side to utilize the same for projecting a side view of necessarily vertically positioned articles onto a remote vertical screen, said projector having a box-like case the upper side of which is closed by a transparent stage upon which transparencies are normally placed to have a light image thereof projected on a vertical screen, a suitable light source within said case from which light is directed outwardly through said stage in a cone of light for projecting said light image upwardly, and a projection head supported in spaced aligned relation with said stage to intercept said cone of light to change direction of and project said light image toward said screen, said stand comprising: a first normally horizontally disposed frame including supporting means adapted to receive one side of said box-like case to position the stage of said projector in a vertical position, and a narrow work-receiving surface disposed close to said supporting means affording a surface across which the light is directed and upon which articles may be placed; a second upright frame pivotally connected to one end of said first frame; and reflecting means supported in inclined relation on the uppermost portion of said second frame above said projection head for directing a light image of the placed articles toward the remote vertical screen; said frames having a cushioning protective coating.

References Cited by the Examiner
UNITED STATES PATENTS

| 314,771 | 3/85 | Abbott | 88—97 |
| 2,730,011 | 1/56 | Kleinhample et al. | 88—24 |

NORTON ANSHER, *Primary Examiner.*

WILLIAM MISIEK, *Examiner.*